United States Patent [19]
Seike et al.

[11] Patent Number: 5,367,591
[45] Date of Patent: Nov. 22, 1994

[54] REINFORCED OPTICAL FIBER AND METHOD OF MANUFACTURE

[75] Inventors: Takeo Seike; Satoshi Endo, both of Kanagawa, Japan

[73] Assignee: Sumitomo Electric Industries, Ltd., Osaka, Japan

[21] Appl. No.: 995,898

[22] Filed: Dec. 23, 1992

[30] Foreign Application Priority Data

Feb. 7, 1992 [JP] Japan .................. 4-056050

[51] Int. Cl.⁵ .................. G02B 6/44; B65H 69/02
[52] U.S. Cl. .................. 385/51; 385/42; 385/43; 385/50; 385/95; 385/96; 385/99; 385/123; 385/126; 156/60; 156/158; 156/166
[58] Field of Search ......... 385/42, 43, 46, 51, 385/50, 95, 96, 97, 98, 99, 123, 126; 156/157, 158, 166, 60

[56] References Cited

U.S. PATENT DOCUMENTS

| | | | |
|---|---|---|---|
| 4,254,865 | 3/1981 | Pacey et al. | 385/99 X |
| 4,509,820 | 4/1985 | Murata et al. | 385/99 X |
| 4,537,468 | 8/1985 | Degoix et al. | 385/96 X |
| 4,746,189 | 5/1988 | Arrington et al. | 385/99 X |
| 4,863,234 | 9/1989 | Gladenbeck et al. | 385/99 X |
| 4,906,068 | 3/1990 | Olson et al. | 385/43 X |
| 4,923,268 | 5/1990 | Xu | 385/96 X |
| 5,208,883 | 5/1993 | Hattori et al. | 385/43 |
| 5,247,598 | 9/1993 | Takimoto et al. | 385/99 |
| 5,249,246 | 9/1993 | Szanto | 385/99 X |
| 5,261,018 | 11/1993 | Suganuma et al. | 385/99 X |

FOREIGN PATENT DOCUMENTS

| | | | |
|---|---|---|---|
| 0106116 | 4/1984 | European Pat. Off. | 385/43 X |
| 0124927 | 11/1984 | European Pat. Off. | 385/95 X |
| 0257841 | 3/1988 | European Pat. Off. | 385/95 X |
| 0357429A3 | 3/1990 | European Pat. Off. | 385/43 X |

OTHER PUBLICATIONS

Patent Abstracts of Japan, vol. 15, No. 439 (P-1273) Nov. 1991.
Patent Abstracts of Japan, vol. 13, No. 271 (P-889) Jun. 1989.

*Primary Examiner*—Brian Healy
*Attorney, Agent, or Firm*—Cushman, Darby & Cushman

[57] ABSTRACT

An optical fiber reinforcing structure and method of manufacture thereof for reinforcing an optical fiber having a cladding portion removed to expose a fiber core portion. The optical fiber with the fiber core portion is placed in a longitudinal groove of a reinforcing member. The optical fiber is fixed to the reinforcing member at the ends of the longitudinal groove using an adhesive. A cover is then fixed to the reinforcing member to hermetically seal the optical fiber within the longitudinal groove. The reinforcing structure of the present invention prevents environmental conditions from adversely affecting the optical characteristics of the optical fiber.

34 Claims, 3 Drawing Sheets

REINFORCED OPTICAL FIBER AND METHOD OF MANUFACTURE

BACKGROUND OF THE INVENTION

1. Field of the Invention

The present invention relates to a reinforced optical fiber having a bare fiber, such as an optical fiber with a fusion-spliced portion or an optical coupler, and a method of manufacture thereof.

2. Description of the Related Art

Methods of coupling optical fibers are well known in the art. In a conventional coupling method the coating at the coupling ends of two optical fibers is removed to expose bare fibers. The bare fibers butted against each other are then heated by means of laser light, electric discharge, etc. to fuse the bare fiber ends together.

"Recent Optical Fiber Coupler Technology", Optoelectronics (1988)No. 5, P.125 describes the fusion drawing method of coupling optical fiber cores. In the fusion drawing method the coating of a plurality optical fibers is removed to expose the bare optical fibers. The exposed optical fibers are bundled through heating fusion in which they are twisted or arranged in parallel. Subsequently the bundled portion is heated and drawn. Drawing is stopped when a characteristic such as coupling ratio reaches a predetermined value, thereby forming a coupling portion.

The conventional optical fiber core coupling methods leave unprotected a portion of bare optical fiber. In this unprotected state the bare optical fiber may become damaged from external factors such as external stress.

Japanese Patent Application Laid - Open No. 271208/1988 discloses a conventional reinforcing structure. A drawn portion (small-diameter molten portion) of the optical fiber core is suspended and nondrawn portions of (large-diameter molten portions) on both sides of the drawn portion of the optical fiber are fixed to a case or jig.

Japanese Patent Application Laid - No. 254406/1988 discloses a multi-core optical fiber coupler reinforcing structure. A pair of comb teeth-shaped fixing portions having a plurality of grooves are arranged on a substrate. The fixing portion are in a face-to-face relationship with each other in a longitudinal direction of the substrate. A plurality of optical fiber couplers are arranged in a direction perpendicular to a direction in which two optical fibers are arranged.

Typically these conventional reinforcing methods use a reinforcing member made of quartz glass having a coefficient of linear expansion equal to that of the optical fibers to prevent thermal stress from affecting the optical fibers. However, quartz glass is transparent and effects the optical properties of the optical fibers. Furthermore, quartz glass is a brittle material and easily damaged.

Additionally, typical conventional reinforcing methods cover the bare optical fiber portions with adhesive. This impairs the optical characteristics of the optical fibers.

Due to the difference in rigidity between the reinforcing member and the optical fiber the conventional reinforcing methods produce an undesirable bending stress which can concentrate on the optical fibers in the vicinity of the reinforcing member.

Furthermore, in conventional reinforcing methods the optical fibers are not hermetically sealed within the reinforcing structure. Water and other external environmental elements can enter the reinforcing structure. Thus the strength of transmission deteriorates, and variations in transmission loss occur at high temperatures or in a water environment.

In those conventional reinforcing methods using a reinforcing member made of a material whose coefficient of linear expansion differs from that of the optical fibers. Transmission loss changes due to a change in external environment temperature.

SUMMARY OF THE INVENTION

An object of the present invention is to provide a reinforced optical fiber structure and method of manufacture thereof which prevents adverse changes in an optical fiber's optical characteristics or damage to the optical fiber due to external factors such as temperature change and mechanical stress.

To achieve the above and other objects, the present invention provides a method of reinforcing at least one optical fiber having a cladding portion thereof removed to expose at least one bare fiber core portion hereinafter termed the bare fiber portion. The method includes the steps of placing the optical fiber with the bare fiber portion in a longitudinal groove of a reinforcing member. Then the optical fiber is fixed at the ends of the longitudinal groove with an adhesive. The optical fiber is then hermetically sealed within the longitudinal groove. To achieve the hermetical seal, a cover is placed over the longitudinal groove containing the bare fiber portion of the optical fiber.

The hermetically sealed reinforced optical fiber structure prevents water and other external environmental factors from effecting the optical properties of the optical fiber. Additionally, by fixing the optical fiber core to the ends of the longitudinal groove the optically important bare fiber portions do not contact the adhesive. Therefore the optical characteristics of the optical fiber are not impaired.

Other objects, features, and characteristics of the present invention; methods, operation, and functions of the related elements of the structure; combination of parts; and economies of manufacture will become apparent from the following Detailed Description of the Preferred Embodiments and accompanying drawings, all of which form a part of this specification, wherein like reference numerals designate corresponding parts in the various figures.

BRIEF DESCRIPTION OF THE DRAWINGS

FIG. 1b is a sectional view of the reinforced optical fiber structure in FIG. 1a;

DESCRIPTION OF THE PREFERRED EMBODIMENTS

Figure 1A:
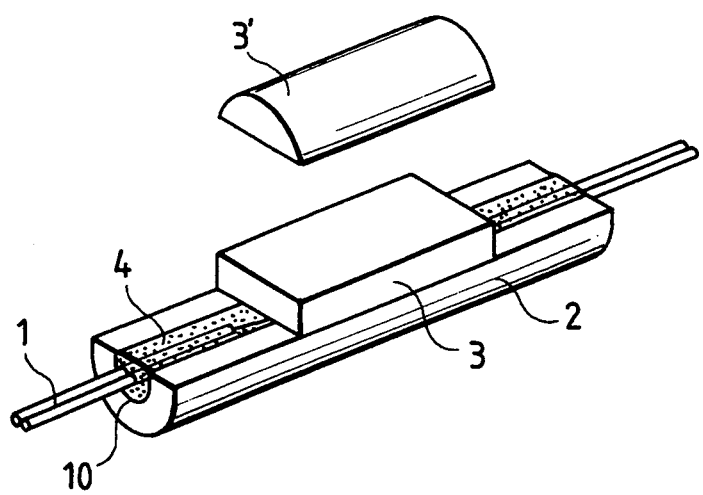
FIG. 1a is a plan view of a reinforced optical fiber structure produced according to the method of the present invention.
Figure 1B:
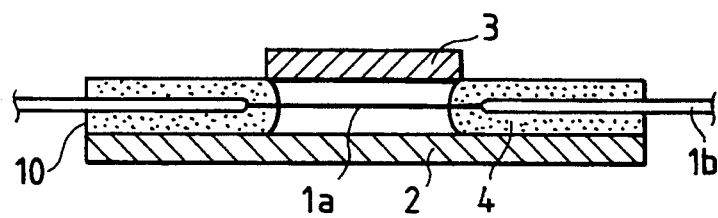
Figure 9:
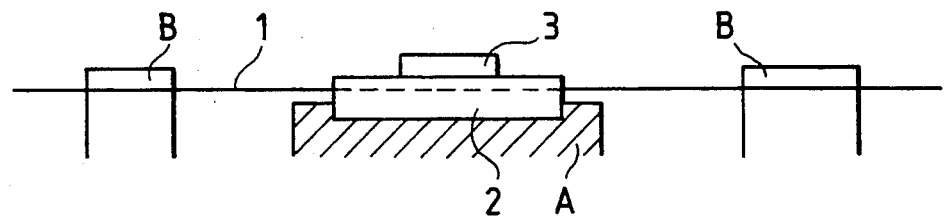
FIG. 9 is a side view of an example of optical fiber supporting means.

Referring to FIGS. 1a and 1b, an embodiment of the method of the present invention will be described. Reference 1 denotes an optical fiber, 1a denotes a bare fiber portion, 1b denotes a cladding portion, 2 denotes a reinforcing member, 10 denotes a longitudinal groove in reinforcing member 2, 3 denotes a cover, and 4 denotes an adhesive. The cross-section of the reinforcing member 2 in a direction perpendicular to longitudinal groove 10 is substantially semi-circular as shown in FIG. 1a. In this embodiment, the cross-section of longitudinal groove 10 perpendicular to the direction of longitudinal groove 10 is also semi-circular. The optical fiber 1 is placed in longitudinal groove 10, and fixed at both ends of the longitudinal groove 10 by means of the adhesive 4. FIG. 1b shows that the adhesive 4 surrounds a portion of bare fiber portion 1a. However, the adhesive 4 may be arranged so as not to exceed cladding portion 1b. The adhesive 4 does not flow into the longitudinally central portion of the longitudinal groove 10 because of its surface tension. The adhesive 4 suspends the optical fiber 1 within the longitudinal groove 10. Accordingly, the central portion of the bare fiber portion 1a does not contact the inner surface of the longitudinal groove 10 or the cover 3. In a preferred embodiment of the present invention it is preferable to pour the adhesive 4 when the reinforcing member 2 and the optical fiber 1 are supported by an appropriate supporting means, for example, as shown in FIG. 9 (A represents a holder for a reinforcing member 2 and B represents a fiber cramper).

Cover 3 covers the central portion of the longitudinal groove 10 not filled with adhesive 4. In the embodiment shown in FIGS. 1a and 1b the cover spans from the adhesive 4 at one end of longitudinal groove 10 to the adhesive 4 at the other end of longitudinal groove 10. The adhesive 4 can be used to fix the cover 3 to the reinforcing member 2 by attaching the cover 3 when adhesive 4 is in an unsolidified state. In an alterative embodiment, a separate adhesive can be used to fix cover 3 to reinforcing member 2. The cover 3 and adhesive 4 hermetically seal the bare fiber portion 1a within longitudinal groove 10 preventing the entrance of water, moisture, or other environmental elements adverse to the optical characteristic of the optical fiber 1.

In a preferred embodiment, a reinforcing member formed of opaque material is selected as reinforcing member 2. Likewise, a cover formed of opaque material is selected as cover 3. For example the opaque material may be one of ceramic, light shielding glass, or opaque crystalline glass. In the embodiment shown in FIGS. 1a and 1b opaque, crystalline glass was used as reinforcing member 2. Reheating glass of a special composition deposits fine crystals in the glass to obtain crystalline glass. The crystalline glass includes transparent and white opaque glass. Neoceram (registered trademark) N-11 of Nippon Electric Glass Co., Ltd. belongs to the latter and has a coefficient of thermal expansion of $-0.15$ at $-50°$ C. to $0°$ C., and $0.15$ at $0°$ C. to $50°$ C. This is a small coefficient of thermal expansion as compared with the coefficient of thermal expansion of $0.3$ at $-50°$ C. to $0°$ C., and $0.48$ at $0°$ C. to $50°$ C. for quartz glass.

As shown in FIG. 1a the shape of cover 3 is not limited to a planer configuration, but may have an accurate cross-section in a direction perpendicular to longitudinal groove 10 as shown by cover 3'. The cover may also take on various other configurations.

FIGS. 2a–2d illustrate optical fibers and optical fiber couplers which may be reinforced by the method of the present invention. In FIGS. 2a–2d reference numeral 5 denotes a spliced point, and reference numeral 6 denotes a coupling portion.

Figure 2A:
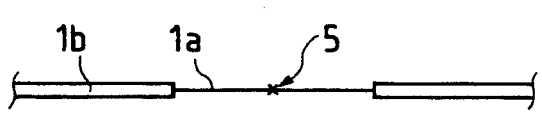
FIGS. 2a–2d are examples of optical fiber fusion splices and optical fiber couplers which can be reinforced according to the present invention.

In FIG. 2a bare optical fiber portions 1a of two optical fibers are fusion spliced at the splicing point 5.

Figure 2B:
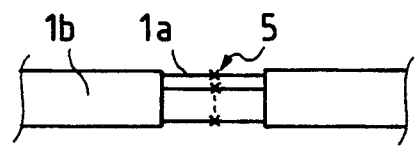

In FIG. 2b two optical fiber cores having a plurality of optical fibers, tape cores, are coated with cladding portion 1b. The plurality of bare fiber portions 1a are butted against each other and fusion spliced at splicing points 5.

Figure 2C:
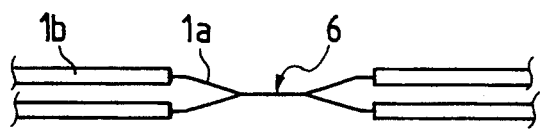

FIG. 2c shows a 2×2 optical fiber coupler. The bare fiber portions 1a are fusion- drawn to form the coupling portion 6.

Figure 2D:
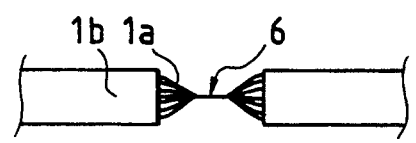

The tape cores of FIG. 2d having bare fiber portions 1a are fusion drawn to form an n×n optical fiber coupler. The glass portion of these optical fibers are reinforced in such a manner as to be accommodated in the central portion of the reinforcing member are described with reference to FIG. 1.

It is to be understood that the method of the present invention is not limited to reinforcing the optical fiber cores described above with respect to FIGS. 2a–2d, but may be applied to various other optical fibers.

Figure 3A:
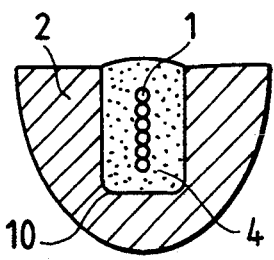
FIGS. 3a–3c are sectional views of optical fiber arrangements within the reinforcing structure of the present invention.
Figure 3B:
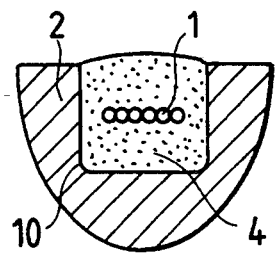
Figure 3C:
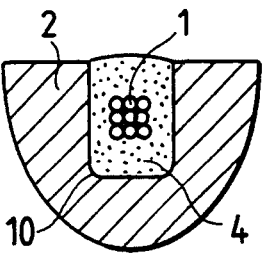

FIGS. 3a–3c are sectional views of bonding portions of reinforced optical fiber structures.

FIGS. 3a and 3b show optical fibers 1 respectively arranged vertically and horizontally in a row, such as when tape cores or multiple single optical fiber cores are used. FIG. 3c shows a matrix or an array arrangement of optical fiber cores, such as with the parallel arrangement of tape cores or multiple single optical fiber cores.

Figure 4A:
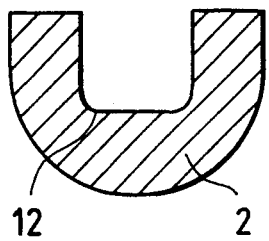
FIGS. 4a and 4b are sectional views of a reinforcing member according to the present invention.
Figure 4B:
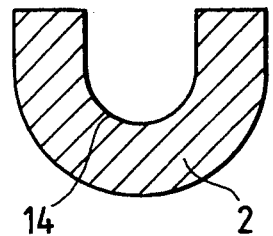

FIGS. 4a and 4b are sectional views of reinforcing member 2 perpendicular to longitudinal grooves 12 and 14, respectively. Longitudinal groove 12 is a rectangular groove with arcuate or rounded corners. Longitudinal groove 14 is a groove with a semi-circular bottom portion. Elimination of a groove's corners prevents the mechanical strength of reinforcing member 2 from declining due to temperature changes as shown in the cross sectional views of FIGS. 5a and 5b.

Figure 5A:
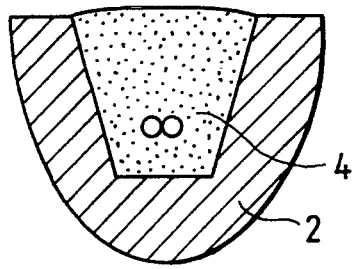
FIGS. 5a and 5b are sectional views of reinforcing members without arcuate longitudinal grooves.
Figure 5B:
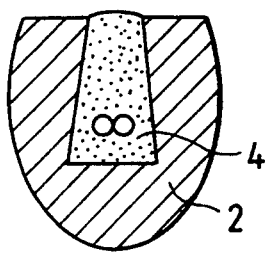

FIGS. 5a and 5b illustrates the contraction and expansion of adhesive 4 due to temperature changes. When the temperature is high the adhesive 4 expands as shown in FIG. 5a. When the temperature is low adhesive 4 shrinks as shown in FIG. 5b. Stress caused by changes in temperature concentrate in the vicinity of each corner at the bottom of the longitudinal grooves in FIGS. 5a and 5b. These stresses can structurally damage or break reinforcing member 2.

The problems encountered when the coefficient of thermal expansion of the optical fiber core differs from that of the reinforcing member are easily adjusted for by the method of the present invention. A loose or curved bare fiber portion impairs the optical characteristics of an optical fiber and increases transmission loss. Proper application of a tensile force in the manufacture of the reinforced optical fiber structure prevents loosening or curving of the bare fiber portion. When the coefficient of linear expansion of the reinforcing member is greater than the coefficient of linear expansion of the optical fiber core, the optical fiber core displaces in a direction to pull the optical fiber during a temperature rise. However, displacement in a direction to loosen the optical fiber occurs during a temperature drop. In the method of the present invention bonding of the optical fiber core to the reinforcing member is performed while applying a tensile force for preventing the optical fiber from loosening at an estimated low temperature. The estimated low temperature is a system implementation quantity that is dependent upon the environmental conditions under which the reinforced optical fiber structure will be used. Therefore, the present invention prevents loosening of the bare fiber portion at low temperatures.

Conversely, when the coefficient of linear expansion of the reinforcing member is less than the coefficient of linear expansion of the optical fiber core, the optical fiber core displaces in a direction to loosen the optical fiber during a temperature rise. However, displacement in a direction to pull to the optical fiber occurs during a temperature drop. The method of the present invention bonds the optical fiber core the reinforcing member while applying a tensile force for preventing the optical fiber from loosening at an estimated high temperature. The estimated high temperature is a system implementation quantity that is dependent upon the environmental conditions experienced by the reinforced optical fiber structure during use. Therefore, the present invention prevents loosening of the bare fiber portion during a temperature rise.

When the aforementioned crystalline glass, i.e., Neoceram (registered trademark) N-11 is used as the reinforcing member 2, the optical fiber core is bonded to the reinforcing member while applying a tensile force which prevents the optical fiber core from loosening at high temperatures since the coefficient of linear expansion of crystalline glass less than that of the optical fiber core (which is typically constructed of quartz glass).

Figure 6:
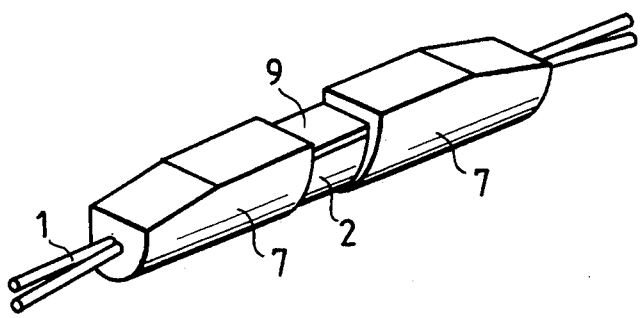
FIGS. 6–8 are plan views of reinforced optical fiber structures according to the present invention.
Figure 7:
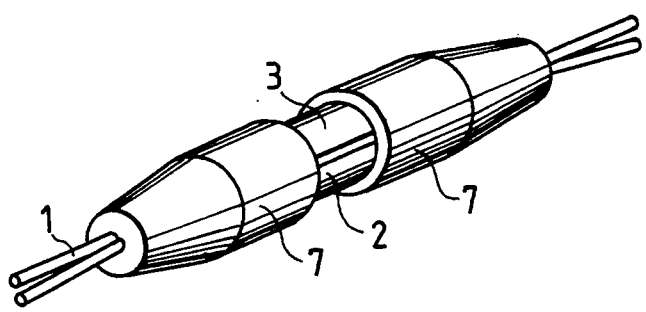
Figure 8:
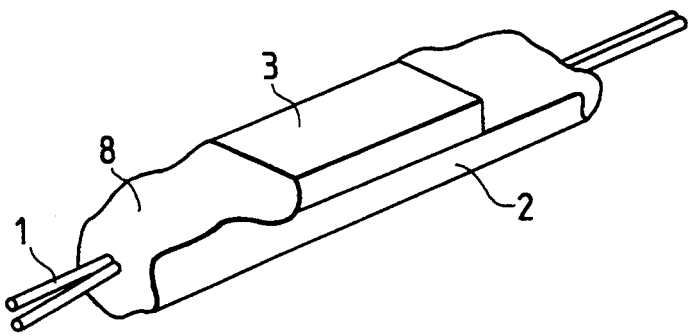

FIGS. 6–8 are plan views of further embodiments of the present invention. In FIG. 6 a pair of boot like protective members 7 are attached on each end of reinforcing member 2. One end of each protective member 7 has a hole through which optical fiber cores are inserted. The other end of each protective members 7 in FIG. 6 accommodates a reinforcing structure having a cover 3 as shown in FIG. 1a. The protective member also has an upper and lower portion. In the embodiment of FIG. 6 the upper portion is planer and the lower portion is semi-circular.

Alternatively, the protective members can have a circular shape as shown in FIG. 7. These protective members 7 are suitable for use with the cover 3' shown in FIG. 1a. Although the protective members 7 shown in FIGS. 6 and 7 are spaced apart from each other leaving exposed portions of cover 3 or 3' and reinforcing member 2, the protective members 7 may be formed sufficiently long to completely cover the reinforced optical fiber structure. The protective members improve the overall strength of reinforcing member 2.

FIG. 8 illustrates a reinforced optical fiber structure which is covered with an amorphous protective member 8, such as silicon rubber. Besides improving the overall strength of reinforcing member 2, the protective member 8 provides improved sealing from external elements.

While the invention has been described in connection with what is presently considered the most practical and preferred embodiments, it is understood that the invention is not limited to the disclosed embodiments, but on the contrary is intended to cover various modifications and equivalent arrangements included within the spirit and scope of the appended claims.

What is claimed is:

1. A method of reinforcing at least one optical fiber which has a portion of its cladding removed to expose at least a portion of a core of the fiber, the method comprising the steps of:
   placing the optical fiber with the exposed fiber core portion in a longitudinal groove of a reinforcing member, the longitudinal groove having a first and a second end;
   fixing portions of said cladding of the optical fiber substantially at the first and the second end of the longitudinal groove with an adhesive; and
   placing a cover over a portion of the longitudinal groove thereby defining an air gap surrounding said exposed fiber core so as to seal hermetically the exposed fiber core within the longitudinal groove, said cover and said reinforcing member being formed of opaque material.

2. The method of claim 1, wherein the placing step includes the step of selecting a semicircular reinforcing member, formed of a material having a different coefficient of linear expansion from that of the optical fiber, as the reinforcing member.

3. The method of claim 2, wherein the fixing step includes the steps of applying a tensile force to the optical fiber, and applying an adhesive substantially at the first and the second end of the longitudinal groove.

4. The method of claim 1, wherein the step of placing the cover includes utilizing said adhesive to fix said cover to said reinforcing member with respect to said cladding so as to seal hermetically said exposed fiber core within said groove.

5. The method of claim 1, further comprising the step of covering the first and second end of the longitudinal groove with a first and second protective member, respectively.

6. The method of claim 3, further comprising the step of covering the first and the second end of the longitudinal groove with a first and second protective member, respectively.

7. The method of claim 4, further comprising the step of covering the first and the second end of the longitudinal groove with a first and second protective member, respectively.

8. The method of claims 1, further comprising the step of covering the reinforcing member with an amorphous protective member.

9. The method of claim 3, further comprising the step of covering the reinforcing member with an amorphous protective member.

10. The method of claim 4, further comprising the step of covering the reinforcing member with an amorphous protective member.

11. The method of claim 1, wherein the placing step includes the step of selecting a semicircular reinforcing member.

12. The method of claim 1, wherein the placing step includes the step of selecting a semicircular reinforcing member having a rectangular longitudinal groove as the reinforcing member, the rectangular longitudinal grooving having rounded corners.

13. The method of claim 1, wherein the placing step includes the step of selecting a semicircular reinforcing member having a longitudinal groove with an arcuate bottom.

14. The method of claim 1, wherein the placing step includes the step of selecting a semicircular reinforcing member formed of crystalline glass as the reinforcing member.

15. The method of claim 1, wherein the placing step includes the step of selecting a semicircular reinforcing member having a rectangular longitudinal groove with rounded corners, and having a different coefficient of linear expansion from that of the optical fiber, as the reinforcing member.

16. The method of claim 1, wherein the placing step includes the step of selecting a semicircular reinforcing member, which is formed of crystalline glass, has a rectangular longitudinal groove with rounded corners, and has a different coefficient of linear expansion from that of the optical fiber, as the reinforcing member.

17. A reinforced optical fiber structure, comprising:
at least one optical fiber having a cladding covering at least one fiber core, a portion of the cladding being removed to expose at least a portion of the fiber core;
a reinforcing member having a longitudinal groove, the longitudinal groove having a first and a second end, the optical fiber with the exposed fiber core portion being disposed within the longitudinal groove;
adhesive means for securing portions of said cladding of the optical fiber to the first and the second end of the longitudinal groove; and
cover means for covering a portion of the longitudinal groove thereby defining an air gap surrounding said exposed fiber core so as to seal hermetically the exposed fiber core in the longitudinal groove, said cover means and said reinforcing member being formed from opaque material.

18. The reinforced optical fiber structure of claim 17, wherein the reinforcing member has a semicircular cross section in a direction perpendicular to the longitudinal groove and is formed of a material having a different coefficient of linear expansion from that of the optical fiber.

19. The reinforced optical fiber structure of claim 17, further comprising first and second protective members covering the first and the second end of the longitudinal groove, respectively.

20. The reinforced optical fiber structure of claim 17, wherein the longitudinal groove is rectangular with rounded corners.

21. The reinforced optical fiber structure of claim 18, wherein the longitudinal groove is rectangular with rounded corners.

22. The reinforced optical fiber of claim 17, wherein the longitudinal groove is semicircular.

23. The reinforced optical fiber of claim 18, wherein the longitudinal groove is semicircular.

24. The reinforced optical fiber structure of claim 17, wherein the reinforcing member is formed of crystalline glass.

25. The reinforced optical fiber structure of claim 21, wherein the reinforcing member is formed of crystalline glass.

26. The reinforced optical fiber structure of claim 17, further comprising an amorphous protective material covering the reinforcing member.

27. The reinforced optical fiber structure of claim 17, wherein the cover means has a semicircular cross section in a direction perpendicular to the longitudinal groove.

28. The reinforced optical fiber structure of claim 17, wherein a plurality of optical fibers are arranged linearly within the longitudinal groove.

29. The reinforced optical fiber structure of claim 17, wherein a plurality of fibers with exposed fiber core portions are fused together and arranged linearly within the longitudinal groove.

30. The reinforced optical fiber structure of claim 17, wherein a plurality of optical fibers are arranged in an array within the longitudinal groove.

31. The reinforced optical fiber structure of claim 17, wherein a plurality of fibers with exposed fiber core portions are fused together and arranged in an array within the longitudinal groove.

32. Reinforced optical fibers, comprising:
at least first and second optical fibers each having a cladding covering a fiber core, a portion of each optical fiber cladding being removed to expose a portion of fiber core, the exposed fiber core portions of the first and the second optical fibers being fused together;
a reinforcing member having a longitudinal groove, the longitudinal groove having a first and a second end, and the first and the second optical fibers with fused fiber core portions being disposed within the longitudinal groove;
adhesive means for securing portions of said cladding of the first and the second optical fibers to both the first and the second end of the longitudinal groove; and
cover means for covering a portion of said longitudinal groove thereby defining an air gap surrounding said fused fiber core portions so as to seal hermetically the fused fiber core portions of first and the second optical fiber in the longitudinal groove, said cover means and said reinforcing member being formed from opaque material.

33. A method of reinforcing at least one optical fiber, a portion of a cladding of the optical fiber being removed to expose at least a portion of the fiber core, the method comprising the steps of:
placing the optical fiber with the fiber core portion in a longitudinal groove of a reinforcing member, the longitudinal groove having first and second ends, the longitudinal groove being rectangular and having rounded corners,
fixing portions of the cladding of the optical fiber substantially at the first and the second end of the longitudinal groove with an adhesive, and
hermetically sealing the fiber sore portion within the longitudinal groove.

34. A reinforced optical fiber structure comprising:
at least one optical fiber having a cladding covering at least one fiber core, a portion of the cladding being removed to expose at least a portion of the fiber core,
a reinforcing member having a longitudinal groove, the longitudinal groove having first and second ends, and the optical fiber with the exposed fiber core portion being disposed within the longitudinal groove,
an adhesive securing portions of said cladding of the optical fiber to the first and the second end of the longitudinal groove,
a cover hermetically sealing the exposed fiber core portion in the longitudinal groove, and
first and second protective members disposed over the first and the second end of the reinforcing member.

* * * * *